Dec. 31, 1957 P. J. HAYDEN 2,818,301
RETRACTABLE TRACTOR WHEEL LAND GRIPS
Filed Nov. 20, 1956 2 Sheets-Sheet 1

Inventor
Peter Joseph HAYDEN
By A. John Michel
Attorney

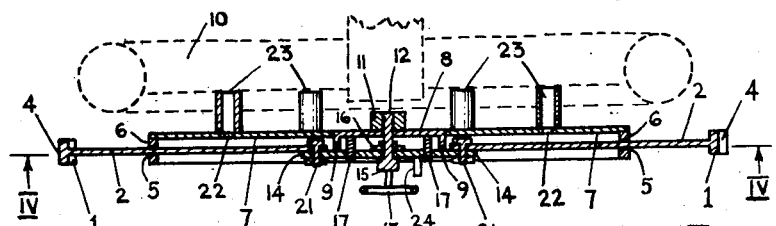
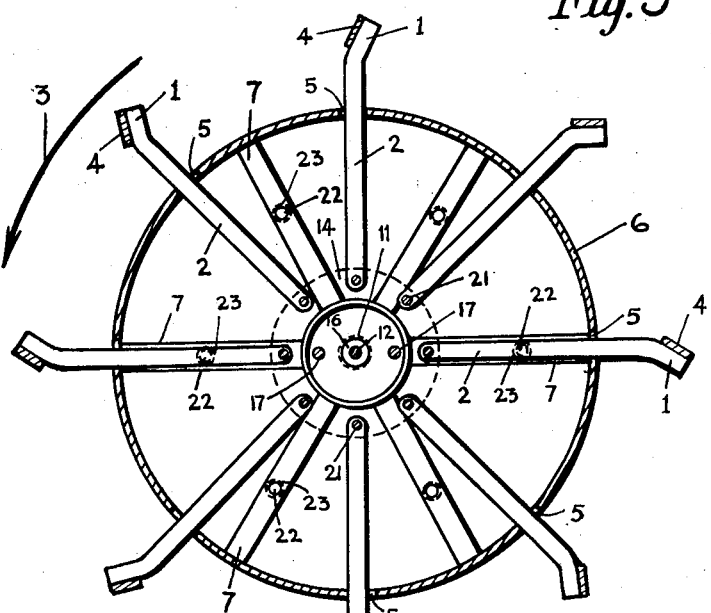
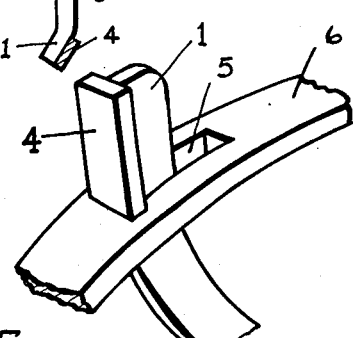

United States Patent Office 2,818,301
Patented Dec. 31, 1957

2,818,301

RETRACTABLE TRACTOR WHEEL LAND GRIPS

Peter Joseph Hayden, Strokestown, Ireland, assignor to Peter Anthony Connellan, Strokestown, County Roscommon, Ireland Application November 20, 1956, Serial No. 623,441

Claims priority, application Ireland July 30, 1957

6 Claims. (Cl. 301—46)

This invention relates to retractable tractor wheel land grips and has for its object to provide a construction of the said land grips which will permit ready assembly to the tractor wheel, on which the land grips may be left permanently fitted if desired, the assembly permitting the extension of the grips for land work or their retraction for road work in a matter of seconds without the use of a spanner or other accessory tools.

It is a further object of the invention to provide a construction of the said land grips which will permit of one or more intermediate extended positions between the fully extended position of the grips and their fully retracted position, and to permit of the extended grips being effective for reverse driving.

The invention will be more clearly understood from the following description of one preferred embodiment of the invention given by way of example only with reference to the accompanying drawings in which—

Fig. 3 is a sectional view taken on the line III—III of Fig. 1, and also showing the tractor wheel in dotted outline.

Fig. 4 is a sectional view taken on the line IV—IV of Fig. 3.

Fig. 5 is a perspective detail view to an enlarged scale.

Figure 1:
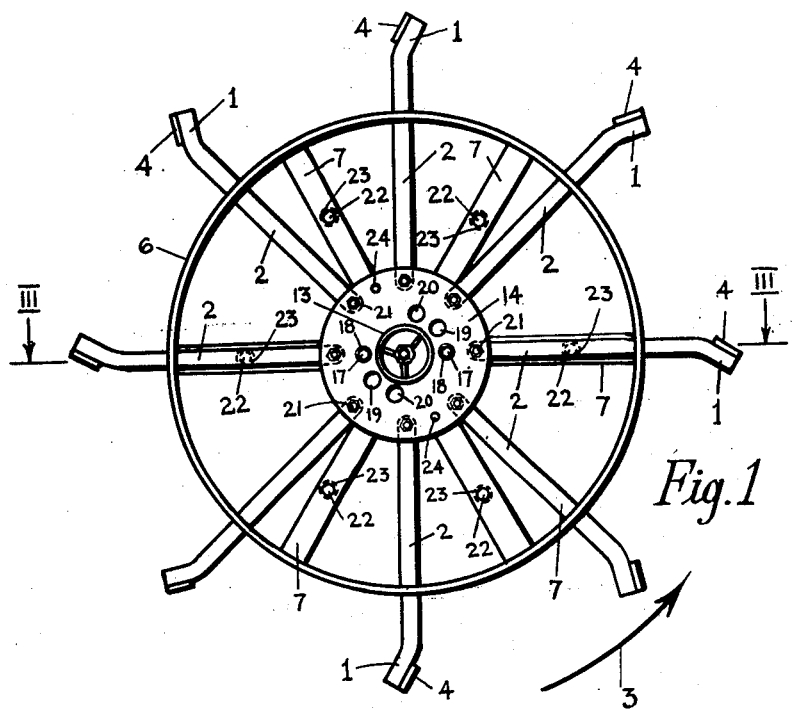
Fig. 1 is a front elevational view of the land grip assembly showing the land grips in fully extended position.

Referring to the drawings, each retractable land grip 1 is formed at the outer end of an arm 2 by cranking the arm 2 rearwardly with reference to the direction of forward rotation as indicated by the arrow 3, and welding a foot plate 4 thereto so that each land grip 1 is substantially of T-section.

The arms 2 pass through slots 5 provided a uniformly spaced distance on the circumferential rim 6 of a spider frame the spokes 7 of which are rigidly connected at their inner ends to the spider hub 8 of channel section, the circumferential flange 9 of which projects outwardly away from the tractor wheel 10. The hub 8 is provided with a boss 11 on its rear side, the hub 8 and boss 11 being centrally bored and internally screw threaded to receive the screw threaded spindle 12 of a locking hand wheel 13, the spindle 12 passing through a central bore of a circular plate 14 which is held between a shoulder 15 and a collar 16 fixed to the spindle 12. Rotation of the hand wheel 13 will, therefore, move the plate 14 axially with reference to the hub 8, a pair of stud pins 17 fixed to the hub 8 passing through one or the other of three pairs of diametrically aligned holes 18, 19, and 20 provided in plate 14. In its innermost locked position, the rear surface of plate 14 abuts against the peripheral flange 9 of the channel sectioned hub 8.

The inner ends of the arms are 2 pivotally connected to the plate 14 by bolts 21, the shank portions of which underneath the heads of the bolt are left non-threaded for a suitable distance to allow adequate clearance between the head of each bolt and the plate 14 to prevent binding of the arms 2 therebetween.

The spider frame is mounted on the tractor wheel 10 by bolts passing through holes 22 in the spokes 7 situated at a radius thereon such that they will align with the bolt holes in the tractor wheel 10, whereby both the tractor wheel 10 and the spider frame may be mounted together by merely employing a set of bolts similar to but longer than the normal tractor wheel securing bolts. Spacing sleeves 23 secured to the rear sides of the spokes 7 concentric with the holes 22 serve to space the spider frame laterally away from the pneumatic tire so that no fouling of the tire can occur.

Having bolted the land grip spider frame assembly to the tractor wheel 10, and assuming that it is desired to extend the grip arms 2 for land use, hand wheel 13 and its spindle 12 is rotated sufficiently to move plate 14 outwardly clear of the studs 17 and plate 14 is rotated to bring the pair of holes 18 into register with the studs 17, the plate 14 being provided with a pair of finger grip studs 24 to facilitate its rotation. Such rotation of plate 14 extends the grip arms 2 fully, as shown in Fig. 1, the arms 2 sliding in the slots 5, and reverse rotation of hand wheel 13 engages the studs 17 within the holes 18 until the plate 14 abuts against the peripheral rim 9 of the hub 8. The land grips are now locked in fully extended position with the arms 2 in radial alignment with the central axis of the plate 14 and hub 8.

Figure 2:
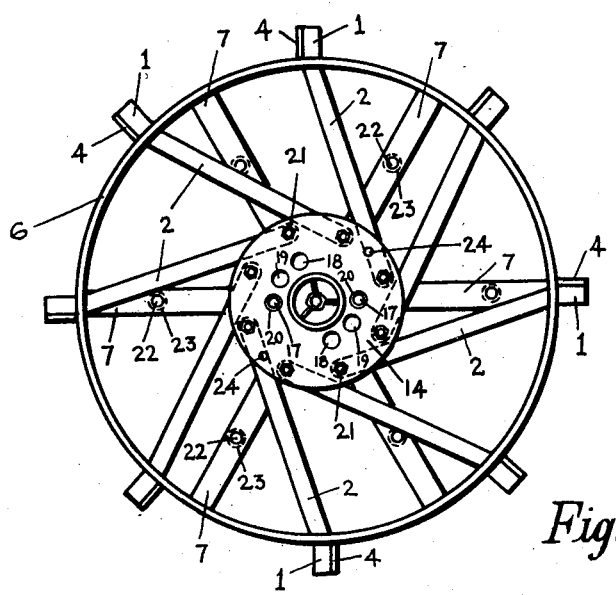
Fig. 2 is a view similar to Fig. 1 but showing the land grips in fully retracted position.

To retract the grip arms 2 fully for road use, the plate 14 is disengaged from the studs 17 by rotating hand wheel 13, and plate 14 is rotated clockwise viewing Figs. 1 and 2 until the pair of holes 20 are aligned with the studs 17 whereupon hand wheel 13 is rotated in the reverse direction to lock the plate 14 on the studs 17 with the grip arms 2 fully retracted as shown in Fig. 2. In this retracted position, the bottom edge of each foot plate 4 abuts against the rim 6 as shown in Fig. 5.

It will be apparent that in a similar manner the studs 17 could be engaged in the pair of holes 19 to lock plate 14 with the grip arms 2 extended to an intermediate position, and if desired the plate 14 may be provided with additional pairs of diametrically aligned holes similar to holes 19 to permit of the setting of the land grips to any one of a number of extended positions intermediate between the fully extended and fully retracted positions.

The gripping ends 1 of the arms 2 are cranked rearwardly to the direction of rotation sufficiently to ensure that each grip 1 will be withdrawn from the soil vertically so as to prevent the throwing up of soil as each land grip 1 emerges therefrom.

It will be noted that the land grips according to the invention will be fully effective for reverse driving of the tractor, in which case each grip arm 2 will bear against the end of the slot 5 opposite to that which it bears against for forward driving. It will also be noted that the construction according to the invention permits rapid and convenient alteration of the setting of the land grips without the use of a spanner or other accessory tool.

I claim:

1. An assembly of retractable tractor wheel land grips comprising a circular spider frame adapted for concentric mounting on the tractor wheel in spaced apart relation therewith, a peripheral rim on the spider frame with spaced apart circumferential slots therein, a central hub on the spider frame, a locking hand wheel with a central spindle having screw threaded engagement with the central hub, a central plate rotatably mounted on the hand wheel spindle and axially movable therewith relative to the hub as said hand wheel is rotated in me and tractor wheel to the tractor axle hub
set of bolts.

n assembly as claimed in claim 4, spacing
ured to the rear of the spider frame concentric
olts holes therein for spacing the spider frame
the tractor wheel.

ssembly as claimed in claim 1, in which the
of each grip arm is cranked rearwardly in
the direction of rotation for vertical emer-
he land grip on the end of each grip arm from

References Cited in the file of this patent

UNITED STATES PATENTS

| | | |
|---|---|---|
| Lambert | | Dec. 15, 1914 |
| Lantz | | Nov. 14, 1922 |
| Darvill | | Jan. 29, 1952 |

FOREIGN PATENTS

| | | |
|---|---|---|
| France | | Nov. 3, 1953 |
| Denmark | | Apr. 4, 1955 |